United States Patent
Ji

(10) Patent No.: US 11,429,719 B2
(45) Date of Patent: Aug. 30, 2022

(54) MULTI-CONTAINER-BASED TRUSTED APPLICATION PROCESSING METHOD AND RELATED DEVICE

(71) Applicant: HUAWEI TECHNOLOGIES CO., LTD., Guangdong (CN)

(72) Inventor: Jie Ji, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 193 days.

(21) Appl. No.: 16/872,642

(22) Filed: May 12, 2020

(65) Prior Publication Data

US 2020/0272737 A1    Aug. 27, 2020

Related U.S. Application Data

(63) Continuation of application No. PCT/CN2019/088082, filed on May 23, 2019.

(30) Foreign Application Priority Data

May 25, 2018  (CN) .......................... 201810516372.8

(51) Int. Cl.
*G06F 21/57*   (2013.01)
*G06F 21/53*   (2013.01)
(Continued)

(52) U.S. Cl.
CPC .............. *G06F 21/57* (2013.01); *G06F 21/53* (2013.01); *G06F 21/74* (2013.01); *H04L 63/0823* (2013.01)

(58) Field of Classification Search
CPC .......... G06F 21/53; G06F 21/57; G06F 21/74; G06F 21/54; H04L 63/0823
See application file for complete search history.

(56) References Cited

U.S. PATENT DOCUMENTS 10,285,050 B2 *   5/2019  Park ...................... H04W 12/35
2004/0039924 A1 *  2/2004  Baldwin ............... H04L 9/0894
                                              713/189

(Continued)

FOREIGN PATENT DOCUMENTS

CN          105429760 A        3/2016
CN          106815494 A        6/2017

(Continued)

OTHER PUBLICATIONS

International Search Report dated Aug. 21, 2019, issued in counterpart CN Application No. PCT/CN2019/088082, with English translation (12 pages).

(Continued)

*Primary Examiner* — Beemnet W Dada
(74) *Attorney, Agent, or Firm* — WHDA, LLP

(57) ABSTRACT

This application discloses a multi-container-based trusted application processing method and a related device, to simplify a trusted application development and deployment process, and improve trusted application processing efficiency and security of an access interface of a trusted execution environment. The method of this application includes: performing, by a terminal, an integrity check on a signed security computation unit by using a security computation container, if the signed security computation unit succeeds in the integrity check, performing, by the terminal, a validity check on the signed security computation unit by using the security computation container, and obtaining a check result; and if the check result is valid, loading, by the terminal, the signed security computation unit by using a trusted execution environment (TEE) or a secure element (SE), and obtaining a security computation result of a trusted application.

13 Claims, 9 Drawing Sheets

(51) Int. Cl.
*G06F 21/74* (2013.01)
*H04L 9/40* (2022.01)

(56) References Cited

U.S. PATENT DOCUMENTS

| | | |
|---|---|---|
| 2015/0074745 A1 | 3/2015 | Stern et al. |
| 2016/0275290 A1 | 9/2016 | Kotary et al. |
| 2016/0350534 A1* | 12/2016 | Poornachandran ... H04L 9/3273 |
| 2018/0113817 A1 | 4/2018 | Banginwar et al. |

FOREIGN PATENT DOCUMENTS

| | | | |
|---|---|---|---|
| CN | 107277020 A | 10/2017 | |
| CN | 107567629 A | 1/2018 | |
| EP | 3284274 B1 | 7/2019 | |

OTHER PUBLICATIONS

Extended (Supplementary) European Search Report dated May 7, 2021, issued in counterpart EP application No. 19807800.8. (9 pages).
The Partial Supplementary European Search Report dated Jan. 15, 2021, issued in counterpart EP Application No. 19807800.8. (9 pages).

\* cited by examiner

MULTI-CONTAINER-BASED TRUSTED APPLICATION PROCESSING METHOD AND RELATED DEVICE

CROSS-REFERENCE TO RELATED APPLICATIONS

This application is a continuation of International Application No. PCT/CN2019/088082, filed on May 23, 2019, which claims priority to Chinese Patent 201810516372.8, filed on May 25, 2018. The disclosures of the aforementioned applications are hereby incorporated by reference in their entireties.

TECHNICAL FIELD

This application relates to the communications field, and in particular, to a multi-container-based trusted application processing method and a related device.

BACKGROUND

Currently, terminal security mainly relates to five fields: identity authentication, admission control, security authentication, service authorization, and service audit. In the field of security authentication, more-secure solutions are emerging, such as a hardware device based on a universal serial bus key (USB Key), a trusted execution environment (TEE), and a secure element (SE). The trusted execution environment TEE can meet various security requirements of upstream and downstream participants in a mobile payment scenario, such as consumers, merchants, mobile operators, third-party payment participants, and financial institutes, and is one of the most promising technologies. Currently, the TEE technology has been widely applied to mobile phones, set top boxes, tablets, and other devices.

In the related art, an application running in a rich execution environment (REE) is referred to as a client application (CA), such as an operating system prone to an attack, for example, Android, or a third-party application. An application running in a TEE is referred to as a trusted application (TA), such as a program that executes key services, for example, signature and encryption/decryption computation. To improve security, a highly security-sensitive TA is isolated from an REE by using a TEE, to provide a dedicated secure execution environment for the TA, and ensure confidentiality and integrity of and an access permission to a resource and data of the TA. Because a TA runs in a TEE/SE, a deployment/upgrade operation of the TA needs to strictly comply with security verification specifications of a TEE/SE distributor (usually a terminal vendor).

Because an application architecture of an existing TEE has some limitations, trusted application management platforms implemented by TEEs of different terminal vendors are different, and consequently a trusted application development and deployment process is relatively complex. A core framework of the TEE technology lies in isolation between an REE and a TEE, and an REE side is prone to an external attack; therefore, high-security-level data processing can be implemented only on a TEE side. Because the TEE needs to take dedicated measures such as a digital signature on security computation unit of a TA so as to ensure that the TEE is truly trusted, a TA developer needs to cooperate with TEE distributors (usually terminal vendors) in development. This kind of coupling relationship between upstream and downstream (the TA developer and the TEE distributors) causes low trusted application TA processing efficiency.

SUMMARY

Embodiments of this application provide a multi-container-based trusted application processing method and a related device, to simplify a trusted application development and deployment process, and improve trusted application processing efficiency and security of an access interface of a trusted execution environment.

A first aspect of this application provides a multi-container-based trusted application processing method, including: performing, by a terminal, an integrity check on a signed security computation unit by using a security computation container, that is, determining whether the signed security computation unit is tampered with by a third party; if the signed security computation unit succeeds in the integrity check, that is, the signed security computation unit is not tampered with by a third party, performing, by the terminal, a validity check on the signed security computation unit by using the security computation container, and obtaining a check result, and if the check result is valid, that is, a signed security computation unit to which a secondary certificate belongs is valid, loading, by the terminal, the signed security computation unit by using a trusted execution environment TEE or a secure element SE, and obtaining a security computation result of a trusted application. The security computation container is introduced, and this avoids an attack to a client application in a TEE, achieves a security effect of isolating a main container from the TEE, and improves security of an access interface of the trusted execution environment.

In a possible design, in a first implementation of the first aspect in the embodiments of this application, the performing, by the terminal, a validity check on the signed security computation unit by using the security computation container, and obtaining a check result includes: obtaining, by the terminal, a secondary certificate of the signed security computation unit by using the security computation container, where the secondary certificate is used to verify validity of the signed security computation unit; sending, by the terminal, the secondary certificate to a verification server by using the security computation container; and receiving, by the terminal by using the security computation container, a check result sent by the verification server. The secondary certificate is allocated to the security computation unit, so that the security computation unit undergoes secondary certificate verification, authentication, and loading in a security computation container other than a main container. This resolves a problem of a lengthy trusted application development process, reduces access costs of a third-party developer and a terminal vendor, and ensures security of verifying and loading the security computation unit.

In a possible design, in a second implementation of the first aspect in the embodiments of this application, the performing, by a terminal, an integrity check on a signed security computation unit by using a security computation container includes: obtaining, by the terminal, a signature file from the signed security computation unit by using a security computation authorization and loading module in the security computation container, obtaining, by the terminal, security computation unit file metadata from the signed security computation unit by using the security computation authorization and loading module; performing, by the terminal, digest computation on the security computation unit file metadata by using the security computation authorization and loading module, to obtain a hash value of the security computation unit file metadata; and performing, by the terminal, a check by comparing the hash value with the signature file by using the security computation authorization and loading module, that is, determining by comparison whether the hash value and the signature file are the same. A specific integrity check process is detailed: In a trusted application development process, the integrity check is performed on the signed security computation unit before the signed security computation unit is loaded to the trusted execution environment, and this improves reliability and security of the signed security computation unit.

In a possible design, in a third implementation of the first aspect in the embodiments of this application, before the performing, by a terminal, an integrity check on a signed security computation unit by using a security computation container, the method further includes: obtaining, by the terminal, a loading request from a main container, where the loading request is used for the security computation container of the terminal to load the signed security computation unit, and the signed security computation unit is configured to perform security computation on the trusted application. A process of obtaining the loading request from the main container is added. A security computation function of the trusted application is separated, and is set in the security computation unit, and a uniform security computation interface is defined, so that the trusted application can run on all terminal platforms after one-time development. This avoids a process in which a third-party developer needs to customize a TA for each terminal platform, and reduces development and distribution costs of the developer and a terminal vendor.

In a possible design, in a fourth implementation of the first aspect in the embodiments of this application, after the loading, by the terminal, the signed security computation unit by using a trusted execution environment TEE or a secure element SE, and obtaining a security computation result of a trusted application, the method further includes: transmitting, by the terminal, the security computation result to the main container of the terminal. The security computation result is fed back to the trusted application, thereby implementing security computation on the trusted application.

In a possible design, in a fifth implementation of the first aspect in the embodiments of this application, the method further includes: if the signed security computation unit fails the integrity check, stopping, by the terminal, a process of loading the signed security computation unit. A process is added, in which loading of the signed security computation unit is stopped when the signed security computation unit fails the integrity check. This ensures effectiveness of the security computation unit, and improves security of the trusted application development process.

In a possible design, in a sixth implementation of the first aspect in the embodiments of this application, the method further includes: if the check result is invalid, stopping, by the terminal, a process of loading the signed security computation unit. A process is added, in which loading of the signed security computation unit is stopped when the secondary certificate is invalid. This ensures the validity of the security computation unit, and improves security of the trusted application development process.

In a possible design, in a seventh implementation of the first aspect in the embodiments of this application, a file format of the signed security computation unit includes at least an initial segment, a code segment, and a data segment. A specific composition of the signed security computation unit is determined, a uniform security computation unit is clarified, and the trusted application development process is simplified.

A second aspect of this application provides a multi-container-based trusted application processing method, including: receiving, by a verification server, a secondary certificate sent by a terminal, where the secondary certificate is used to verify validity of a signed security computation unit; obtaining, by the verification server, a root certificate from a certificate authority server, where the root certificate corresponds to the secondary certificate; verifying, by the verification server, whether the secondary certificate is signed and issued based on the root certificate; and if the secondary certificate is signed and issued based on the root certificate, determining, by the verification server, that the signed security computation unit is valid; or if the secondary certificate is not signed or issued based on the root certificate, determining, by the verification server, that the signed security computation unit is invalid. The verification server verifies validity of the certificate of the security computation unit online, and the security computation unit is loaded only when the certificate is valid, thereby ensuring the validity of the security computation unit.

In a possible design, in a first implementation of the second aspect in the embodiments of this application, the method further includes: sending, by the verification server, a verification result to the terminal, where the verification result is used to indicate whether the signed security computation unit is valid. A process of sending the verification result to the terminal is added, so that the steps in the embodiments of this application are more comprehensive.

In a possible design, in a second implementation of the second aspect in the embodiments of this application, the verifying, by the verification server, whether the secondary certificate is signed and issued based on the root certificate includes: determining, by the verification server, whether public keys of the secondary certificate and the root certificate are the same; and if the public keys are the same, determining, by the verification server, that the secondary certificate is signed and issued based on the root certificate; or if the public keys are different, determining, by the verification server, that the secondary certificate is not signed or issued based on the root certificate. A secondary certificate verification process is detailed, and an implementation in the embodiments of this application is added.

A third aspect of this application provides a terminal, including: a check unit, configured to perform an integrity check on a signed security computation unit by using a security computation container; a first processing unit, configured to: if the signed security computation unit succeeds in the integrity check, perform a validity check on the signed security computation unit by using the security computation container, and obtain a check result, and a second processing unit, configured to: if the check result is valid, load the signed security computation unit by using a trusted execution environment TEE or a secure element SE, and obtain a security computation result of a trusted application. The security computation container is introduced, and this avoids an attack to a client application in a TEE, achieves a security effect of isolating a main container from the TEE, and improves security of an access interface of the trusted execution environment.

In a possible design, in a first implementation of the third aspect in the embodiments of this application, the first processing unit is specifically configured to: obtain a secondary certificate of the signed security computation unit by using the security computation container, where the secondary certificate is used to verify validity of the signed security computation unit; send the secondary certificate to a verification server by using the security computation container, and receive, by using the security computation container, a check result sent by the verification server. The secondary certificate is allocated to the security computation unit, so that the security computation unit undergoes secondary certificate verification, authentication, and loading in a security computation container other than a main container. This resolves a problem of a lengthy trusted application development process, reduces access costs of a third-party developer and a terminal vendor, and ensures security of verifying and loading the security computation unit.

In a possible design, in a second implementation of the third aspect in the embodiments of this application, the check unit is specifically configured to: obtain a signature file from the signed security computation unit by using a security computation authorization and loading module in the security computation container; obtain security computation unit file metadata from the signed security computation unit by using the security computation authorization and loading module; perform digest computation on the security computation unit file metadata by using the security computation authorization and loading module, to obtain a hash value of the security computation unit file metadata; and perform a check by comparing the hash value with the signature file by using the security computation authorization and loading module. A specific integrity check process is detailed: In a trusted application development process, the integrity check is performed on the signed security computation unit before the signed security computation unit is loaded to the trusted execution environment, and this improves reliability and security of the signed security computation unit.

In a possible design, in a third implementation of the third aspect in the embodiments of this application, the terminal further includes: an obtaining unit, configured to obtain a loading request from a main container, where the loading request is used for the security computation container of the terminal to load the signed security computation unit, and the signed security computation unit is configured to perform security computation on the trusted application. A process of obtaining the loading request from the main container is added. A security computation function of the trusted application is separated and is set in the security computation unit, and a uniform security computation interface is defined, so that the trusted application can run on all terminal platforms after one-time development. This avoids a process in which a third-party developer needs to customize a TA for each terminal platform, and reduces development and distribution costs of the developer and a terminal vendor.

In a possible design, in a fourth implementation of the third aspect in the embodiments of this application, the terminal further includes: a transmission unit, configured to transmit the security computation result to the main container of the terminal. The security computation result is fed back to the trusted application, thereby implementing security computation on the trusted application.

In a possible design, in a fifth implementation of the third aspect in the embodiments of this application, the terminal further includes: a first stopping unit, configured to: if the signed security computation unit fails the integrity check, stop a process of loading the signed security computation unit. A process is added, in which loading of the signed security computation unit is stopped when the signed security computation unit fails the integrity check. This ensures effectiveness of the security computation unit, and improves security of the trusted application development process.

In a possible design, in a sixth implementation of the third aspect in the embodiments of this application, the terminal further includes: a second stopping unit, configured to: if the check result is invalid, stop a process of loading the signed security computation unit. A process is added, in which loading of the signed security computation unit is stopped when the secondary certificate is invalid. This ensures the validity of the security computation unit, and improves security of the trusted application development process.

In a possible design, in a seventh implementation of the third aspect in the embodiments of this application, a file format of the signed security computation unit includes at least an initial segment, a code segment, and a data segment. A specific composition of the signed security computation unit is determined, a uniform security computation unit is clarified, and the trusted application development process is simplified.

A fourth aspect of this application provides a server, where the server is a verification server and includes: a receiving unit, configured to receive a secondary certificate sent by a terminal, where the secondary certificate is used to verify validity of a signed security computation unit; an obtaining unit, configured to obtain a root certificate from a certificate authority server; a verification unit, configured to verify whether the secondary certificate is signed and issued based on the root certificate; a first determining unit, configured to: if the secondary certificate is signed and issued based on the root certificate, determine that the signed security computation unit is valid; and a second determining unit, configured to: if the secondary certificate is not signed or issued based on the root certificate, determine that the signed security computation unit is invalid. The verification server verifies validity of the certificate of the security computation unit online, and the security computation unit is loaded only when the certificate is valid, thereby ensuring the validity of the security computation unit.

In a possible design, in a first implementation of the fourth aspect in the embodiments of this application, the server further includes: a sending unit, configured to send a verification result to the terminal, where the verification result is used to indicate whether the signed security computation unit is valid. A process of sending the verification result to the terminal is added, so that the steps in the embodiments of this application are more comprehensive.

In a possible design, in a second implementation of the fourth aspect in the embodiments of this application, the verification unit is specifically configured to: determine whether public keys of the secondary certificate and the root certificate are the same; and if the public keys are the same, determine that the secondary certificate is signed and issued based on the root certificate; or if the public keys are different, determine that the secondary certificate is not signed or issued based on the root certificate. A secondary certificate verification process is detailed, and an implementation in the embodiments of this application is added.

A fifth aspect of this application provides a terminal, including a memory, a transceiver, and at least one processor, where the memory stores program code; the memory, the transceiver, and the at least one processor communicate by using a line; and the processor rims the code to instruct the terminal to execute the method according to any implementation of the first aspect.

A sixth aspect of this application provides a server, including a memory, a transceiver, and at least one processor, where the memory stores program code; the memory, the transceiver, and the at least one processor communicate by using a line; and the processor runs the code to instruct the server to execute the method according to any implementation of the second aspect.

A seventh aspect of this application provides a computer-readable storage medium. The computer-readable storage medium stores program code. When the code is run on a computer, the computer is enabled to perform the method in the first aspect.

An eighth aspect of this application provides a computer-readable storage medium. The computer-readable storage medium stores program code. When the code is run on a computer, the computer is enabled to perform the method in the second aspect.

A ninth aspect of this application provides a computer program product that includes an instruction, and when the computer program product is run on a computer, the computer is enabled to perform the method in the first aspect.

A tenth aspect of this application provides a computer program product that includes an instruction, and when the computer program product is run on a computer, the computer is enabled to perform the method in the second aspect.

It can be learned from the foregoing technical solutions that, the embodiments of this application have the following advantages:

The terminal performs the integrity check on the signed security computation unit by using the security computation container, that is, determines whether the signed security computation unit is tampered with by a third party; if the signed security computation unit succeeds in the integrity check, that is, the signed security computation unit is not tampered with by a third party, the terminal performs the validity check on the signed security computation unit by using the security computation container, and obtains the check result; and if the check result is valid, that is, the signed security computation unit to which the secondary certificate belongs is valid, the terminal loads the signed security computation unit by using the trusted execution environment TEE or the secure element SE, and obtains the security computation result of the trusted application. In this application, the security computation container is introduced, and this avoids an attack to a client application in a TEE, achieves a security effect of isolating a main container from the TEE, improves a current trusted application verification process, and improves security of an access interface of the trusted execution environment.

DESCRIPTION OF EMBODIMENTS

Embodiments of this application provide a multi-container-based trusted application processing method and a related device, to simplify a trusted application development and deployment process, and improve trusted application processing efficiency and security of an access interface of a trusted execution environment.

To make a person skilled in the art understand the technical solutions in this application better, the following describes the technical solutions in the embodiments of this application with reference to the accompanying drawings in the embodiments of this application.

In the specification, claims, and accompanying drawings of this application, the terms "first", "second". "third", "fourth", and so on (if existent) are intended to distinguish between similar objects but do not necessarily indicate a specific order or sequence. It should be understood that data used in such a way is interchangeable in proper circumstances so that the embodiments described herein can be implemented in other orders than the order illustrated or described herein. Moreover, the terms "include", "have", and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
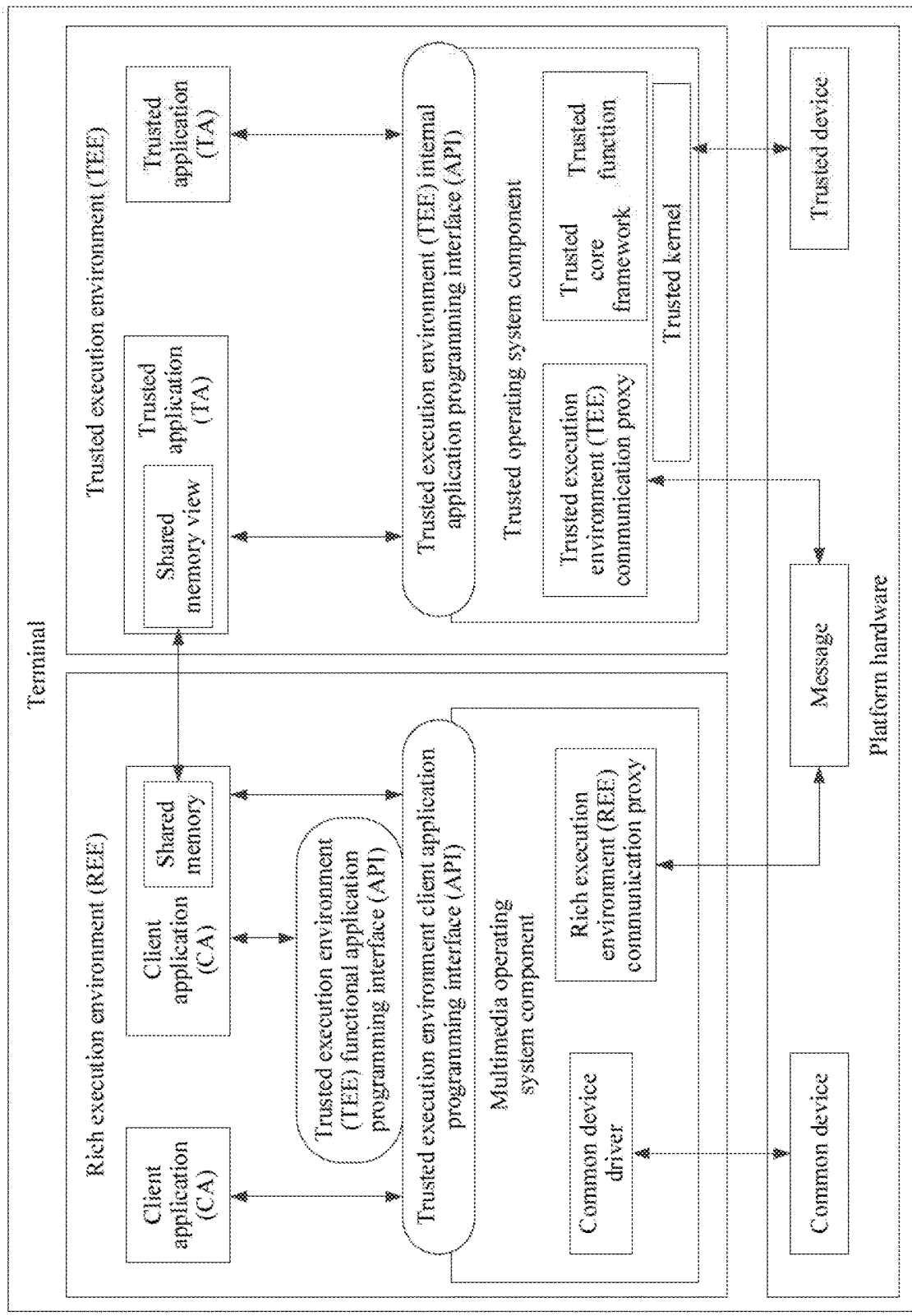
FIG. 1 is a schematic diagram of a system architecture in existing solution application.

A related art solution provides a system architecture, as shown in FIG. 1. The system architecture includes a trusted execution environment (TEE) and a rich execution environment (REE). A highly security-sensitive application is isolated from a general-purpose software environment, to provide a dedicated trusted execution environment TEE, and ensure confidentiality and integrity of and an access permission to a resource and data of the application. Related art operating systems prone to an attack such as Android are provided with a general-purpose rich execution environment REE. An application running on an REE side is referred to as a client application (CA), such as a bank application and other third-party payment applications. An application running on a TEE side is referred to as a trusted application (TA), such as an application that executes key services, for example, signature and encryption/decryption computation. Because a TA runs in a trusted execution environment TEE, a deployment/upgrade operation of the TA needs to strictly comply with security verification specifications of a TEE distributor (usually a terminal vendor), for example, take measures such as a digital signature so as to ensure that the TEE is truly trusted in all links. The trusted execution environment TEE includes a trusted execution environment internal application programming interface (TEE Internal API) and a trusted operating system component. A main function of the TEE internal API is providing a function of the trusted operating system component, communicating with a client application CA, implementing communication between TAs, and providing security storage, a cryptology function, a time function, and the like in an upstream direction. The trusted operating system component mainly includes a trusted core framework, a trusted function, a trusted kernel, and a trusted execution environment TEE communication proxy. The trusted core framework provides a function similar to an operating system for a TA; the trusted function provides a supporting capability for an application developer; the trusted kernel is used for interaction with a trusted device in platform hardware; and the trusted execution environment communication proxy provides a secure communication channel for a TA and a CA, for example, the trusted execution environment communication proxy sends a message to a rich execution environment communication proxy by using the platform hardware, to implement interaction between the TA and the CA. The rich execution environment REE includes a trusted execution environment client application programming interface (TEE Client API), a trusted execution environment functional application programming interface, TEE Functional API), and a multimedia operating system. Multimedia operating system components mainly include a common device driver and the rich execution environment communication proxy. The rich execution environment communication proxy is used to communicate with the TEE and provide a secure communication channel for a CA and a TA. The common device driver is configured to drive a common device in the platform hardware. By using the TEE client API and the TEE functional API, the CA accesses a security service provided by the TA.

Because the system architecture has some limitations, trusted application management platforms implemented by TEEs of different terminal vendors are different, and consequently a TA development and deployment process is relatively complex. Because the TEE side takes dedicated measures such as a digital signature so as to ensure that the TEE is truly trusted, and specific management and control measures are implemented by a specific terminal vendor (a TEE distributor), a trusted application TA developer needs to cooperate with terminal vendors in development. This kind of coupling relationship between upstream and downstream causes a complex and lengthy TA development process. For example, one TA of the Alipay application needs to be developed for a device of each terminal vendor, and each platform has a different TA signature and system interface. As a result, a TA development process and distribution process of the Alipay application are highly complex, and further a security risk exists due to an irregular process. Similarly, other third-party developers may encounter the same problem.

Figure 2:
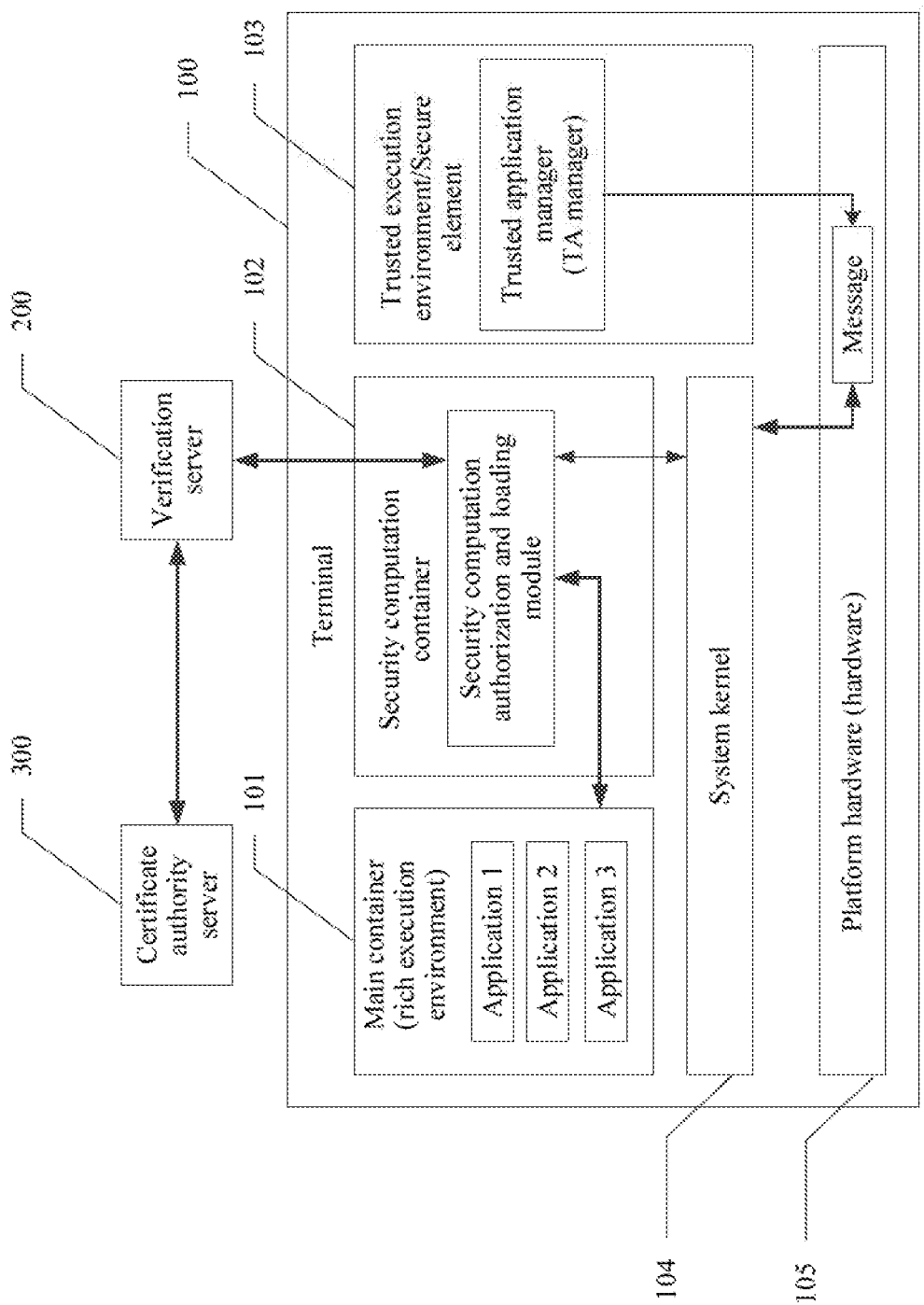
FIG. 2 is a schematic diagram of a system architecture to which an embodiment of this application is applied.

Embodiments of this application can be applied to a system architecture shown in FIG. 2. This system architecture includes a terminal 100, a verification server 200, and a certificate authority (CA) server 300. The terminal provides three application environments: a rich execution environment (REE), a trusted execution environment (trusted execution environment, TEE), and a secure element (SE). The terminal includes a main container 101, a security computation container 102, a trusted execution environment (TEE)/secure element (SE) 103, a system kernel 104, and platform hardware 105. A running environment of the main container 101 is the REE. The main container includes a plurality of applications, such as an application 1, an application 2, and an application 3. The security computation container 102 includes a security computation authorization and loading module. The security computation container is separated from the main container. Hardware supported by the security computation container and hardware supported by the main container are the same. For example, both the security computation container and the main container support using a hardware interface of the REE. The CA server 300 is configured to save all effective certificates provided by a terminal vendor. The effective certificates include a secondary certificate and a root certificate. The terminal vendor may manage these effective certificates on the CA server 300 (for example, query, add, revoke, invalidate, re-authorize, and perform other operations on these effective certificates). The verification server 200 is configured to verify validity of the secondary certificate for the security authorization and loading module. The system architecture of this application may be applied to security computation-related scenarios such as payment and encrypted storage. No specific limitation is imposed herein.

Figure 3:
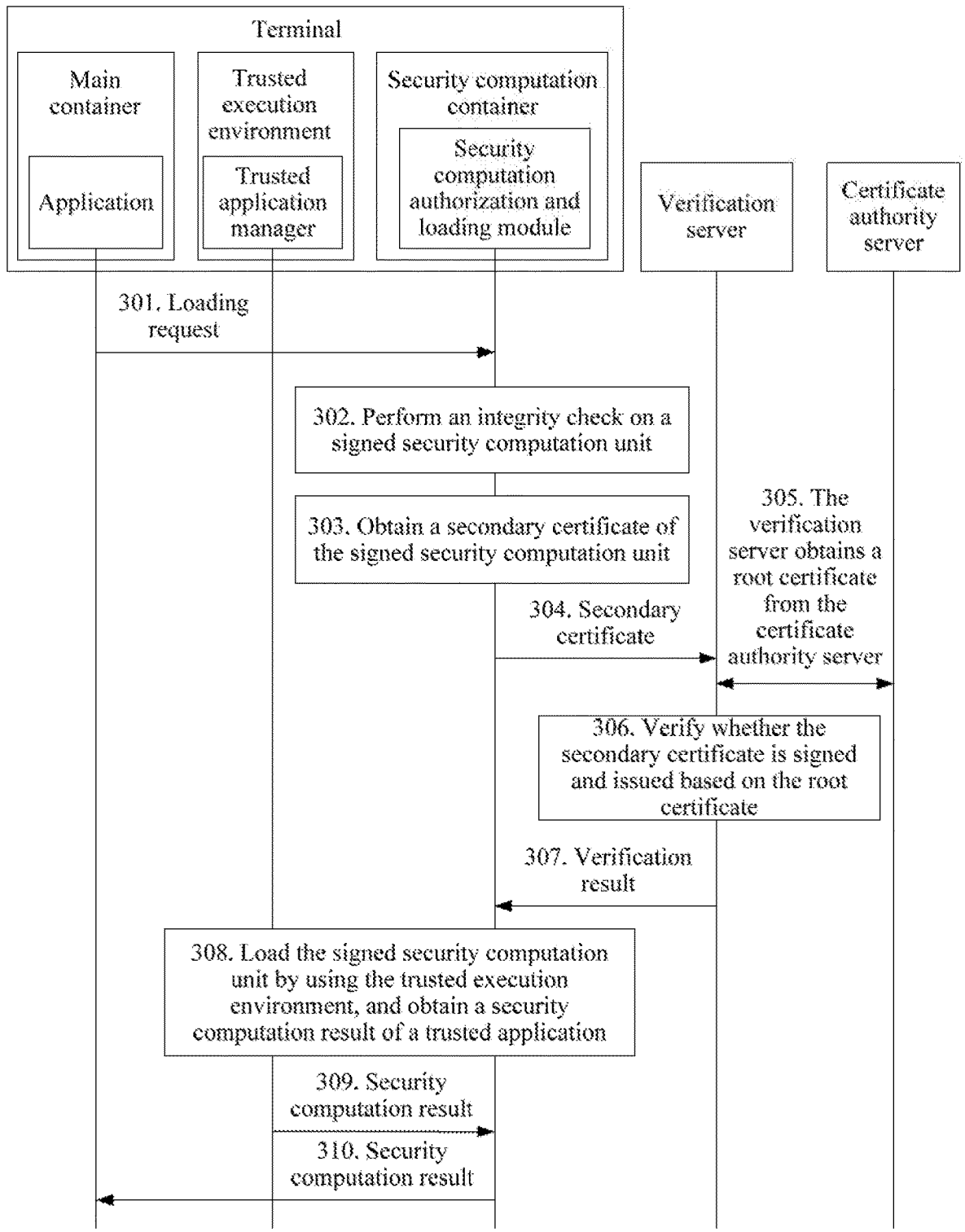
FIG. 3 is a schematic flowchart of a multi-container-based trusted application processing method according to an embodiment of this application.

For ease of understanding, the following describes a specific procedure in the embodiments of this application. Referring to FIG. 3, an embodiment of a multi-container-based trusted application processing method in the embodiments of this application includes the following steps.

301. A terminal obtains a loading request from a main container.

The terminal obtains the loading request from the main container. The loading request is used to instruct a security computation container of the terminal to load a signed security computation unit. The signed security computation unit is configured to perform security computation on a trusted application TA. The security computation unit is a functional module in the trusted application that performs security computation.

Several mutually independent system resources, namely, containers, are isolated from an operating system kernel. Each container runs an independent OS, and the containers cannot access each other. This application provides the main container and the security computation container, where an application environment of the main container is an REE.

The trusted application TA requests the security computation authorization and loading module in the security computation container of the terminal to load the signed security computation unit. Specifically, an intelligent operating system (for example, an Android system) runs in the main container. When needing security computation, an application (for example, Alipay) in the main container no longer directly initiates a call to a TEE, but initiates a call to the security computation container. The signed security computation unit and a parameter are transmitted to the security computation authorization and loading module in the security computation container, and the security computation authorization and loading module checks whether this application has a right to initiate this call.

It should be noted that, before the loading request is sent, a user needs to first develop and obtain an unsigned security computation unit, and then sign the unsigned security computation unit to obtain the signed security computation unit. A process of developing and obtaining the unsigned security computation unit is as follows:

The user (a third-party developer) submits necessary materials to a terminal vendor and applies for a developer certificate from the terminal vendor. The terminal vendor issues the developer certificate (a secondary certificate) to the developer after review and approval, and saves a public key of the secondary certificate on a CA server. The user obtains the unsigned security computation unit by using a security computation unit software development kit (software development kit, SDK) and compiler suite that are provided by the terminal vendor. The SDK includes a C standard library and an encryption/decryption computation library. The compiler suite includes a compiler and a link script. The link script is used to assemble a compiled program into a standard security computation unit. For example, when the user uses Alipay to perform fingerprint-based payment, because fingerprint information is important security data information and needs to be collected in a secure environment, Alipay needs to perform security computation on a fingerprint collection environment by separating and re-compiling a program that executes this function to obtain the unsigned security computation unit, and performing the security computation on the fingerprint collection environment by using the unsigned security computation unit. The link script is specifically used to combine several input files into one output file according to a specific rule. For example, a link script command ENTRY specifies that an entry function of the security computation unit is a compute function. In this case, when loading the security computation unit, the TEE can directly send a to-be-computed parameter to the compute function, to perform security computation and obtain a computation result. Code of the link script is shown as follows:

```
ENTRY(compute)
SECTIONS
{
≈0x10000;
.text:{*(.text)}
≈0x8000000;
.data: {*(.data)}
.bss: {*(.bss)}
}
```

After the compilation by using the compiler, a file format of the unsigned security computation unit is the same as a dynamic library file format, and includes an initial (init) segment, a code segment, a data segment, and the like.

A process of signing the unsigned security computation unit is as follows:

Digest computation is first performed on a compiled unsigned security computation unit file by using a digest algorithm, to obtain a digest file of the security computation unit. Optionally, the digest algorithm may be a secure hash algorithm (SHA), such as SHA256, SHA512, or the like. Then, the digest is signed by using the public key in the secondary certificate issued by the terminal vendor, to generate a signature file, which is specifically a CERT. RSA file. The unsigned security computation unit and the signature file are combined, to eventually obtain the signed security computation unit.

It can be understood that, before the unsigned security computation unit is developed and obtained, a uniform format of the security computation unit needs to be defined, so that the user does not need to consider different TEE technologies for different terminal vendors, and one developed security computation unit can run in TEEs of all terminal platforms.

302. The terminal performs an integrity check on the signed security computation unit by using the security computation container.

After the terminal determines, based on the loading request and the security computation authorization and loading module, that the trusted application TA has the right to initiate the call, the terminal obtains a key file from the signed security computation unit by using the security computation authorization and loading module in the security computation container; obtains security computation unit file metadata from the signed security computation unit by using the security computation authorization and loading module; performs digest computation on the security computation unit file metadata by using the security computation authorization and loading module, to obtain a hash value of the security computation unit file metadata; and performs a check by comparing the hash value with the signature file by using the security computation authorization and loading module. If the signed security computation unit succeeds in the integrity check, that is, the hash value and a hash value of the signature file are the same, the terminal performs step 303. Integrity means that, in a process of transmitting and storing information or data, it is ensured that the information or the data is not tampered with or can be identified quickly after being tampered with.

For example, the security computation authorization and loading module first extracts CERT. RSA information from a security computation unit file header; extracts the security computation unit file metadata from the security computation unit, where a start address of the security computation unit file metadata is a CERT. RSA trailer, and an end address of the security computation unit file metadata is a security computation unit file trailer; and subsequently, performs digest computation on the security computation unit file metadata by using the SHA256 algorithm, to obtain the hash value of the security computation unit metadata.

It should be noted that, if the signed security computation unit fails the integrity check, the terminal may consider that the security computation unit has been tampered with by a third party and stops a process of loading the signed security computation unit.

It can be understood that, in this application, a dedicated "security computation container" is added based on the existing "main container", so that a subsequent processing step prone to a change in security computation processing is separated, and is set in the security computation container. The security computation container still resides on an REE side and uses same hardware as the main container on the REE side, but is isolated from the operating system (Android system) in the main container. It is ensured that data security of the security computation container is relatively high. A computation processing step with a highest security requirement is still completed by the TA in the original TEE. For example, the Alipay program developed by the user no longer directly uses the TEE for security computation. Instead, the security computation container uses the TEE to perform security computation. In the added security computation container, a computation process for a check, authentication, and loading on a security computation unit of Alipay is implemented, and this ensures security of the security computation unit and resolves a TA distribution security problem of the TA developed by the user. In addition, the added security computation container breaks an association between the application and the TEE, thereby addressing a risk of a service denial by the TEE caused by the TA's vulnerability to a malicious call from a CA side.

303. The terminal obtains the secondary certificate of the signed security computation unit by using the security computation container.

The terminal obtains the secondary certificate of the signed security computation unit by using the security computation authorization and loading module in the security computation container, where the secondary certificate is used to verify validity of the signed security computation unit.

For example, the terminal extracts the secondary certificate from the signed security computation unit by using the security computation authorization and loading module, where the secondary certificate is used to indicate authorization information of the signed security computation unit.

304. The terminal sends the secondary certificate to a verification server by using the security computation container.

The terminal sends the secondary certificate to the verification server by using the security computation authorization and loading module in the security computation container.

It should be noted that, the secondary certificate and a root certificate stored in a certificate authority server have a same source and a same public key. The secondary certificate is signed and issued based on the root certificate.

305. The verification server obtains the root certificate from the certificate authority server.

The verification server obtains the root certificate from the certificate authority server.

Specifically, the verification server sends a root certificate obtaining request to the certificate authority server based on target application information carried in the secondary certificate, where the root certificate obtaining request carries the target application information. The certificate authority server sends a corresponding root certificate to the verification server based on the target application information.

306. The verification server verifies whether the secondary certificate is signed and issued based on the root certificate.

The verification server verifies whether the secondary certificate is signed and issued based on the root certificate.

Specifically, the verification server determines whether public keys of the secondary certificate and the root certificate are the same. If the public keys are the same, the verification server determines that the secondary certificate is signed and issued based on the root certificate. If the public keys are different, the verification server determines that the secondary certificate is not signed or issued based on the root certificate. If the secondary certificate is signed and issued based on the root certificate, the verification server determines that the signed security computation unit is valid. If the secondary certificate is not signed or issued based on the root certificate, the verification server determines that the signed security computation unit is invalid.

It can be understood that, verifying a certificate by using a public key belongs to the related art. Details are not described herein again. Other verification methods may alternatively be used to verify validity of the secondary certificate. No specific limitation is imposed herein.

307. The verification server sends a verification result to the terminal.

The verification server sends the verification result to the terminal, where the verification result is used to indicate whether the signed security computation unit is valid.

It should be noted that, if a check result is valid, the terminal performs step 308. If the check result is invalid, the terminal stops a process of loading the signed security computation unit.

308. The terminal loads the signed security computation unit by using a trusted execution environment and obtains a security computation result of the trusted application.

The terminal loads the signed security computation unit by using the trusted execution environment TEE and obtains the security computation result of the trusted application. Specifically, a trusted application manager (TA Manager) of the terminal first checks whether the secondary certificate of the signed security computation unit is valid. After the check succeeds, the TA manager calls a general-purpose interface of the signed security computation unit, to obtain the security computation result and returns the security computation result to the security computation container.

It should be noted that, the terminal may alternatively call the signed security computation unit by using a secure element SE and obtain the security computation result of the TA. A process in which the terminal calls the signed security computation unit by using the SE is similar to a process in which the TEE calls the signed security computation unit. Details are not described herein again.

309. The terminal transmits the security computation result to the security computation container of the terminal by using the trusted execution environment TEE.

The terminal transmits the security computation result to the security computation authorization and loading module in the security computation container of the terminal by using the trusted execution environment TEE.

It should be noted that, the terminal may alternatively transmit the security computation result to the security computation authorization and loading module in the security computation container of the terminal by using the secure element SE.

310. The terminal transmits the security computation result to the main container of the terminal.

The terminal transmits the security computation result to the main container of the terminal. Specifically, the security computation authorization and loading module of the terminal transmits the received security computation result to the trusted application TA in the main container.

In this embodiment of this application, the method for performing a validity check in the security container by using the secondary certificate resolves an existing problem of a lengthy TA development process, opens a security computation capability to a third-party developer, simplifies a TA development and deployment process of the third-party developer, and improves TA processing efficiency. The security computation container is added, and a check, authentication, and loading are performed on the security computation unit in the security computation container. This ensures security of verifying and loading the security computation unit, improves an existing TA verification process, and improves security of an access interface of the TEE. A uniform interface for security computation is specified, to facilitate TA application development.

Figure 4:
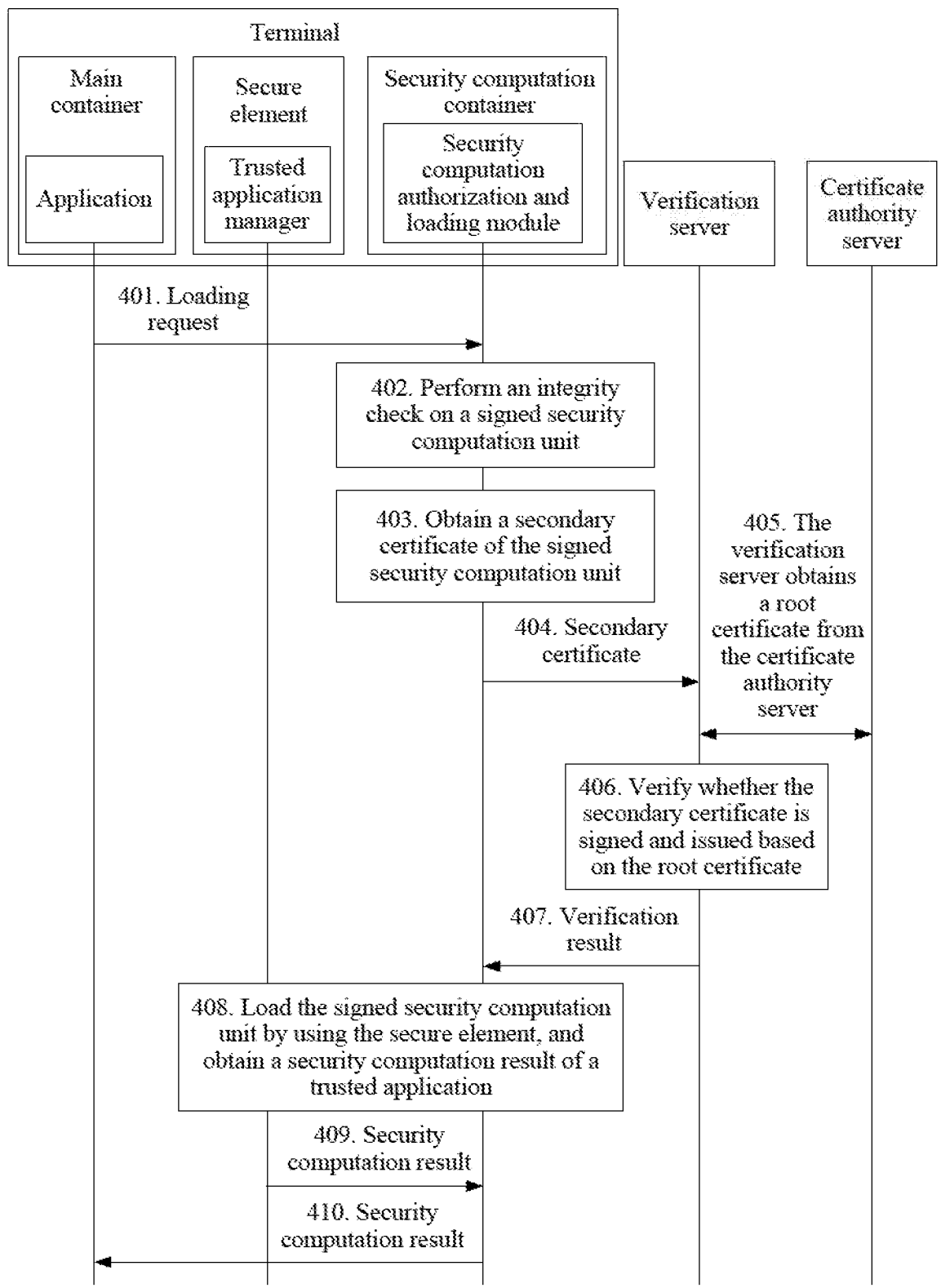
FIG. 4 is another schematic flowchart of a multi-container-based trusted application processing method according to an embodiment of this application.

Referring to FIG. 4, another embodiment of a multi-container-based trusted application processing method in the embodiments of this application includes the following steps.

401. A terminal obtains a loading request from a main container.

The terminal obtains the loading request from the main container, where the loading request is used to instruct a security computation container of the terminal to load a signed security computation unit, and the signed security computation unit is configured to perform security computation on a trusted application TA.

The trusted application TA requests a security computation authorization and loading module in the security computation container of the terminal to load the signed security computation unit. Specifically, an intelligent operating system (for example, an Android system) runs in the main container. When needing security computation, an application (for example, Alipay) in the main container no longer directly initiates a call to a TEE, but initiates a call to the security computation container. The signed security computation unit and a parameter are transmitted to the security computation authorization and loading module in the security computation container, and the security computation authorization and loading module checks whether this application has a right to initiate this call.

402. The terminal performs an integrity check on the signed security computation unit by using the security computation container.

After the terminal determines, based on the loading request and the security computation authorization and loading module, that the trusted application TA has the right to initiate the call, the terminal obtains a key file from the signed security computation unit by using the security computation authorization and loading module in the security computation container; obtains security computation unit file metadata from the signed security computation unit by using the security computation authorization and loading module; performs digest computation on the security computation unit file metadata by using the security computation authorization and loading module, to obtain a hash value of the security computation unit file metadata; and performs a check by comparing the hash value with the signature file by using the security computation authorization and loading module. If the signed security computation unit succeeds in the integrity check, that is, the hash value and a hash value of the signature file are the same, the terminal performs step 303.

403. The terminal obtains a secondary certificate of the signed security computation unit by using the security computation container.

The terminal obtains the secondary certificate of the signed security computation unit by using the security computation authorization and loading module in the security computation container, where the secondary certificate is used to verify validity of the signed security computation unit.

404. The terminal sends the secondary certificate to a verification server by using the security computation container.

The terminal sends the secondary certificate to the verification server by using the security computation authorization and loading module in the security computation container.

405. The verification server obtains a root certificate from a certificate authority server.

The verification server obtains the root certificate from the certificate authority server.

Specifically, the verification server sends a root certificate obtaining request to the certificate authority server based on target application information carried in the secondary certificate, where the root certificate obtaining request carries the target application information. The certificate authority server sends a corresponding root certificate to the verification server based on the target application information.

406. The verification server verifies whether the secondary certificate is signed and issued based on the root certificate.

The verification server verifies whether the secondary certificate is signed and issued based on the root certificate.

Specifically, the verification server determines whether public keys of the secondary certificate and the root certificate are the same. If the public keys are the same, the verification server determines that the secondary certificate is signed and issued based on the root certificate. If the public keys are different, the verification server determines that the secondary certificate is not signed or issued based on the root certificate. If the secondary certificate is signed and issued based on the root certificate, the verification server determines that the signed security computation unit is valid. If the secondary certificate is not signed or issued based on the root certificate, the verification server determines that the signed security computation unit is invalid.

407. The verification server sends a verification result to the terminal.

The verification server sends the verification result to the terminal, where the verification result is used to indicate whether the signed security computation unit is valid.

It should be noted that, if a check result is valid, the terminal performs step 308. If the check result is invalid, the terminal stops a process of loading the signed security computation unit.

Steps 401 to 407 are similar to steps 301 to 307, and details are not described herein again.

408. The terminal loads the signed security computation unit by using a secure element and obtains a security computation result of the trusted application.

The terminal loads the signed security computation unit by using the secure element SE and obtains the security computation result of the trusted application TA. Specifically, a trusted application manager (TA Manager) of the terminal first checks whether the secondary certificate of the signed security computation unit is valid. After the check succeeds, the TA manager calls a general-purpose interface of the signed security computation unit, to obtain the security computation result, and returns the security computation result to the security computation container.

409. The terminal transmits the security computation result to the security computation container of the terminal by using the secure element SE.

The terminal transmits the security computation result to the security computation authorization and loading module in the security computation container of the terminal by using the secure element SE.

410. The terminal transmits the security computation result to the main container of the terminal.

The terminal transmits the security computation result to the main container of the terminal. Specifically, the security computation authorization and loading module of the terminal transmits the received security computation result to the trusted application TA in the main container.

In this embodiment of this application, the security computation container is added, and a check, authentication, and loading are performed on the security computation unit in the security computation container. This ensures security of verifying and loading the security computation unit, improves an existing TA verification process, and reduces access costs of a third-party developer and a terminal vendor. The method for performing a validity check in the security container by using the secondary certificate resolves an existing problem of a lengthy TA development process, opens a security computation capability to the third-party developer, simplifies a TA development and deployment process of the third-party developer, and improves TA processing efficiency.

Figure 5:
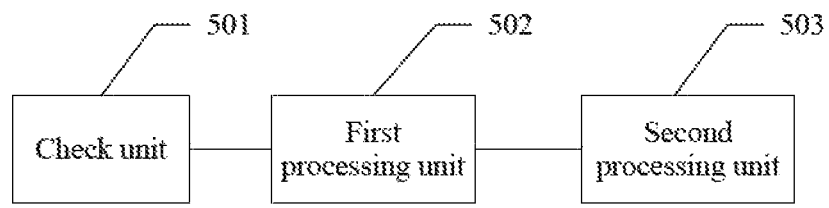
FIG. 5 is a schematic structural diagram of a terminal according to an embodiment of this application.

The foregoing describes the multi-container-based trusted application processing method in the embodiments of this application. The following describes a terminal and a verification server in the embodiments of this application. Referring to FIG. 5, an embodiment of the terminal in the embodiments of this application includes:

a check unit 501, configured to perform an integrity check on a signed security computation unit by using a security computation container;

a first processing unit 502, configured to: if the signed security computation unit succeeds in the integrity check, perform a validity check on the signed security computation unit by using the security computation container, and obtain a check result; and a second processing unit 503, configured to: if the check result is valid, load the signed security computation unit by using a trusted execution environment TEE or a secure element SE, and obtain a security computation result of a trusted application.

In this embodiment of this application, the security computation container is introduced, and this avoids an attack to a client application in a TEE, achieves a security effect of isolating a main container from the TEE, and improves security of an access interface of the trusted execution environment.

Figure 6:
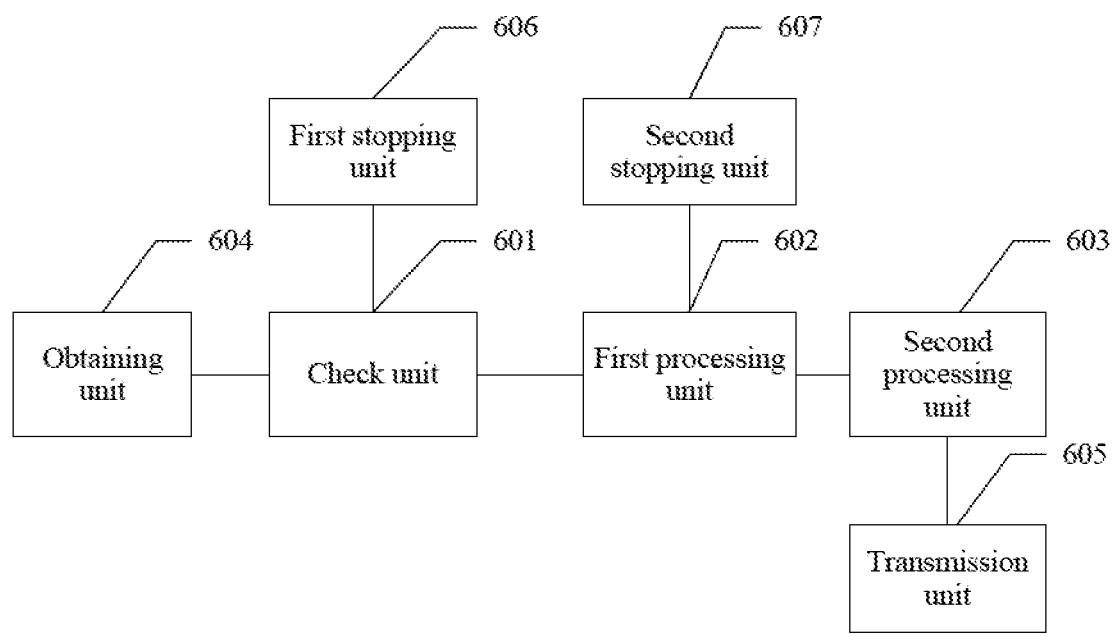
FIG. 6 is another schematic structural diagram of a terminal according to an embodiment of this application.

Referring to FIG. 6, another embodiment of the terminal in the embodiments of this application includes:

a check unit 601, configured to perform an integrity check on a signed security computation unit by using a security computation container;

a first processing unit 602, configured to: if the signed security computation unit succeeds in the integrity check, perform a validity check on the signed security computation unit by using the security computation container, and obtain a check result; and a second processing unit 603, configured to: if the check result is valid, load the signed security computation unit by using a trusted execution environment TEE or a secure element SE, and obtain a security computation result of a trusted application.

In an example, the first processing unit 602 is specifically configured to:

obtain a secondary certificate of the signed security computation unit by using the security computation container, where the secondary certificate is used to verify validity of the signed security computation unit;

send the secondary certificate to a verification server by using the security computation container, and receive, by using the security computation container, a check result sent by the verification server.

In an example, the check unit 601 is specifically configured to:

obtain a signature file from the signed security computation unit by using a security computation authorization and loading module in the security computation container;

obtain security computation unit file metadata from the signed security computation unit by using the security computation authorization and loading module;

perform digest computation on the security computation unit file metadata by using the security computation authorization and loading module, to obtain a hash value of the security computation unit file metadata; and perform an integrity check on the hash value and the signature file by using the security computation authorization and loading module.

In an example, the terminal further includes:

an obtaining unit 604, configured to obtain a loading request from a main container, where the loading request is used for the security computation container of the terminal to load the signed security computation unit, and the signed security computation unit is configured to perform security computation on the trusted application.

In an example, the terminal further includes:

a transmission unit 605, configured to transmit the security computation result to the main container of the terminal.

In an example, the terminal further includes:

a first stopping unit 606, configured to: if the signed security computation unit fails the integrity check, stop a process of loading the signed security computation unit.

In an example, the terminal further includes:

a second stopping unit 607, configured to: if the check result is invalid, stop a process of loading the signed security computation unit.

In an example, a file format of the signed security computation unit includes at least an initial segment, a code segment, and a data segment.

In this embodiment of this application, the security computation container is added, and a check, authentication, and loading are performed on the security computation unit in the security computation container. This ensures security of verifying and loading the security computation unit, improves an existing TA verification process, and improves security of an access interface of the TEE. The method for performing a validity check in the security container by using the secondary certificate resolves an existing problem of a lengthy TA development process, opens a security computation capability to a third-party developer, simplifies a TA development and deployment process of the third-party developer, and improves TA processing efficiency. A uniform interface for security computation is specified, to facilitate TA application development.

Figure 7:
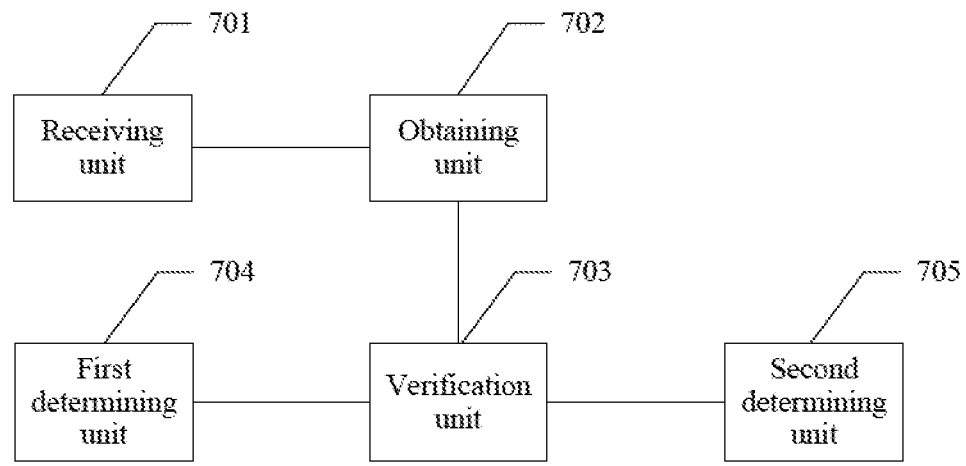
FIG. 7 is a schematic structural diagram of a verification server according to an embodiment of this application.

Referring to FIG. 7, an embodiment of the verification server in the embodiments of this application includes:

a receiving unit 701, configured to receive a secondary certificate sent by a terminal, where the secondary certificate is used to verify validity of a signed security computation unit;

an obtaining unit 702, configured to obtain a root certificate from a certificate authority server;

a verification unit 703, configured to verify whether the secondary certificate is signed and issued based on the root certificate:

a first determining unit 704, configured to: if the secondary certificate is signed and issued based on the root certificate, determine that the signed security computation unit is valid; and a second determining unit 705, configured to: if the secondary certificate is not signed or issued based on the root certificate, determine that the signed security computation unit is invalid.

In this embodiment of this application, the verification server verifies validity of the certificate of the security computation unit online, and the security computation unit is loaded only when the certificate is valid, thereby ensuring the validity of the security computation unit.

Figure 8:
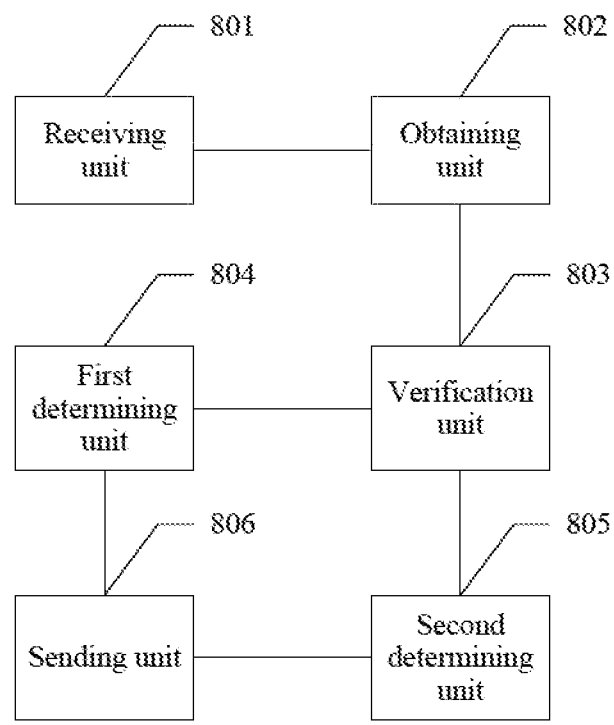
FIG. 8 is another schematic structural diagram of a verification server according to an embodiment of this application.

Referring to FIG. 8, another embodiment of the verification server in the embodiments of this application includes:

a receiving unit 801, configured to receive a secondary certificate sent by a terminal, where the secondary certificate is used to verify validity of a signed security computation unit;

an obtaining unit 802, configured to obtain a root certificate from a certificate authority server;

a verification unit 803, configured to verify whether the secondary certificate is signed and issued based on the root certificate;

a first determining unit 804, configured to: if the secondary certificate is signed and issued based on the root certificate, determine that the signed security computation unit is valid; and a second determining unit 805, configured to: if the secondary certificate is not signed or issued based on the root certificate, determine that the signed security computation unit is invalid.

In an example, the server further includes:

a sending unit 806, configured to send a verification result to the terminal, where the verification result is used to indicate whether the signed security computation unit is valid.

In an example, the verification unit 803 is specifically configured to:

determine whether public keys of the secondary certificate and the root certificate are the same; and if the public keys are the same, determine that the secondary certificate is signed and issued based on the root certificate; or if the public keys are different, determine that the secondary certificate is not signed or issued based on the root certificate.

In this embodiment of this application, the verification server verifies validity of the certificate of the security computation unit online, and the security computation unit is loaded only when the certificate is valid, thereby ensuring the validity of the security computation unit.

FIG. 5 to FIG. 8 above describe in detail the terminal and the verification server in the embodiments of this application from a perspective of a modular functional entity. The following describes in detail the terminal and the verification server in the embodiments of this application from a perspective of hardware processing.

Figure 9A:
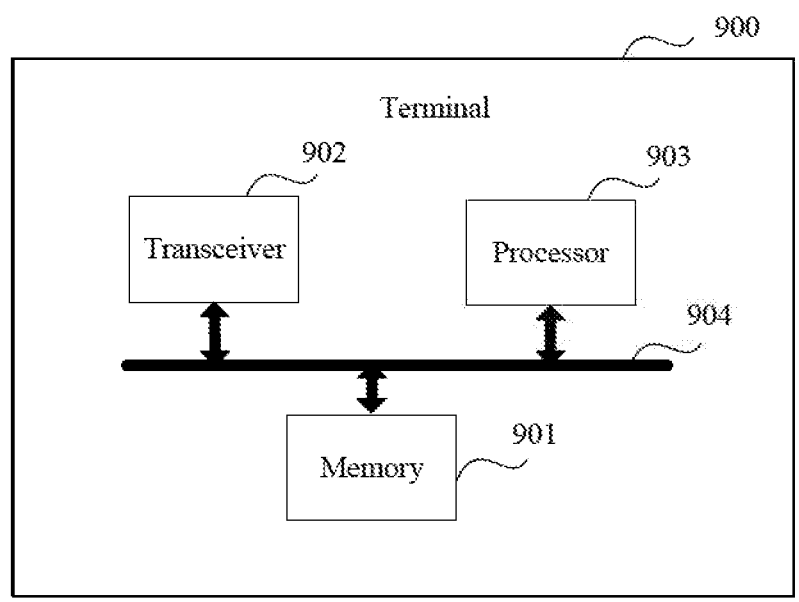
FIG. 9A is another schematic structural diagram of a terminal according to an embodiment of this application.

An embodiment of this application provides a terminal. As shown in FIG. 9A, the terminal includes a memory 901, a transceiver 902, and at least one processor 903. The memory 901 stores program code and data. For example, a protected area in the memory may store a TEE operating system and a trusted application, and an unprotected area in the memory may store an REE operating system and a client application. The memory 901, the transceiver 902, and the at least one processor 903 are interconnected by using a bus 904. The bus 904 may be a peripheral component interconnect (PCI) standard bus, an extended industry standard architecture (EISA) bus, or the like. The processor 903 executes the program code in the memory 901 to instruct the terminal to complete operations in the foregoing method embodiment. This simplifies a trusted application development and deployment process, and improves trusted application processing efficiency.

Figure 9B:
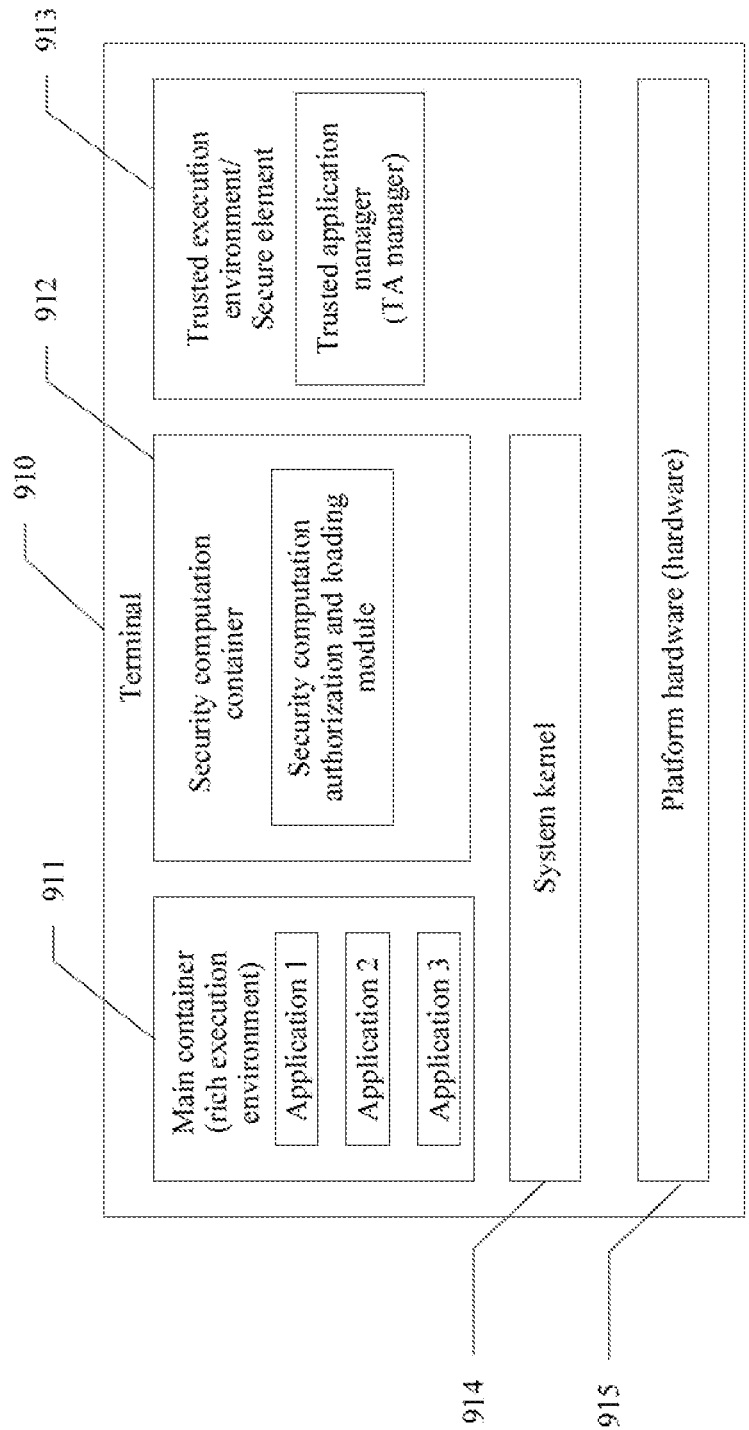
FIG. 9B is another schematic structural diagram of a terminal according to an embodiment of this application.

FIG. 9B is a structural schematic diagram of a terminal provided in an embodiment of this application. Referring to FIG. 9B, a terminal 910 includes a main container 911, a security computation container 912, a trusted execution environment (TEE)/secure element (SE) 913, a system kernel 914, and platform hardware 915. A running environment of the main container 911 is an REE. The main container 911 includes a plurality of applications. The security computation container 912 includes a security computation authorization and loading module. The trusted execution environment/secure element 913 includes a trusted application manager.

Figure 10:
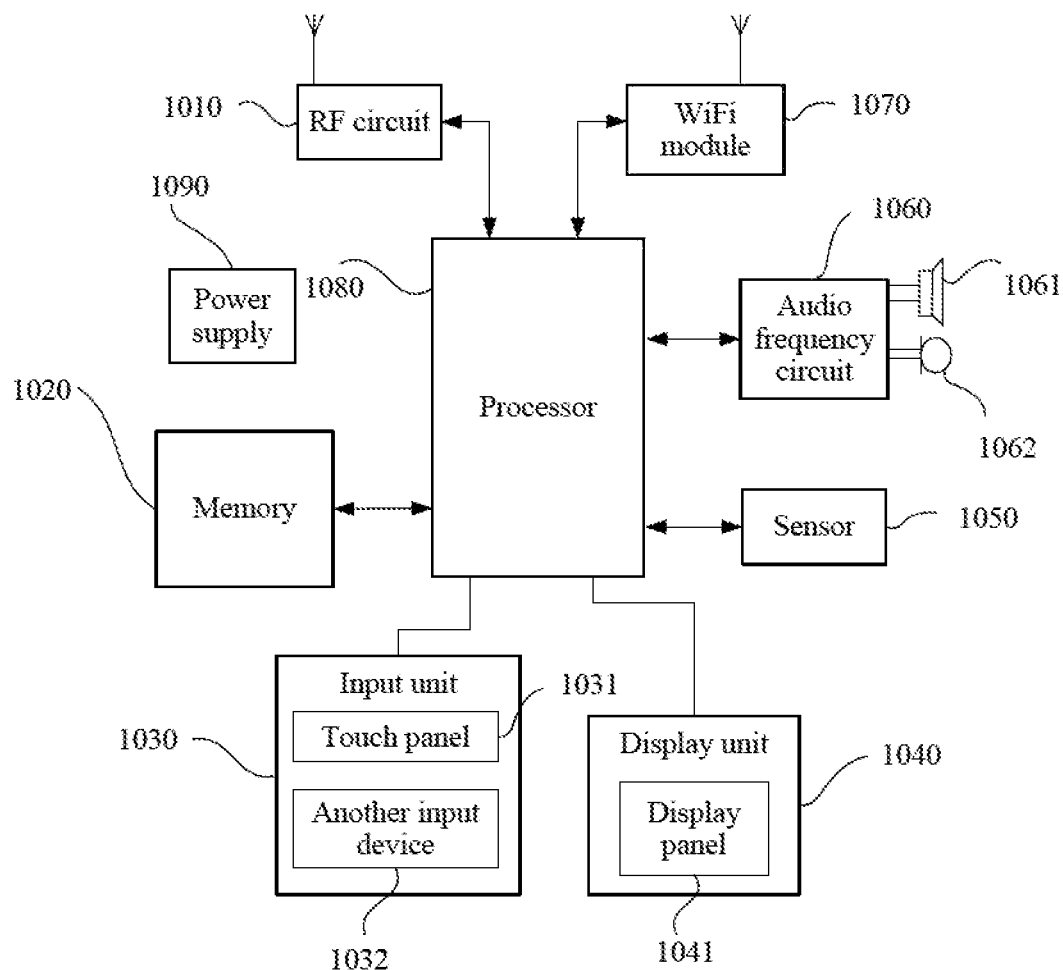
FIG. 10 is another schematic structural diagram of a terminal according to an embodiment of this application.

FIG. 10 is a block diagram of a partial structure of a terminal according to an embodiment of this application. Referring to FIG. 10, the terminal includes components such as a radio frequency (RF) circuit 1010, a memory 1020, an input unit 1030, a display unit 1040, a sensor 1050, an audio frequency circuit 1060, a wireless fidelity (WIFI) module 1070, and a processor 1080. A person skilled in the art can understand that a structure of the terminal shown in FIG. 10 does not constitute a limitation on the terminal, may include more or fewer components than those shown in FIG. 10, combine some components, or have different component arrangements.

The processor 1080 is a control center of the terminal. In this embodiment of this application, the processor 1080 may perform an integrity check on a signed security computation unit, load the signed security computation unit, and obtain a security computation result of a trusted application.

The RF circuit 1010 is connected to the processor 1080 by using a bus, and is responsible for sending data to the Internet or receiving data from the Internet, and may further be configured to receive and send a signal during an information receiving/sending process, for example, send a secondary certificate to a verification server. In addition, after receiving a verification result sent by the verification server, the terminal sends the verification result to the processor 1080 for processing. Generally, the RF circuit 1010 includes but is not limited to an antenna, at least one amplifier, a transceiver, a coupler, a low noise amplifier (LNA), and a duplexer. In addition, the RF circuit 1010 may further communicate with a network and other devices through wireless communication. The foregoing wireless communication may use any communications standard or protocol, including but not limited to global system for mobile communications (GSM), general packet radio service (GPRS), code division multiple access (CDMA), wideband code division multiple access (WCDMA), long term evolution (LTE), an email, and a short message service (SMS).

The memory 1020 may be configured to store a software program and a module. The processor 1080 runs the software program and the module stored in the memory 1020, to perform various function applications and data processing of the terminal. The memory 1020 may mainly include a program storage area and a data storage area. The program storage area may store an operating system, an application required by at least one function (for example, performing an integrity check on a signed security computation unit), and the like. The data storage area may store data created based on use of the terminal (for example, a security computation result) and the like. In addition, the memory 1020 may include a high-speed random access memory, and may further include a non-volatile memory, for example, at least one magnetic disk storage, a flash memory, or another volatile solid state memory.

Figure 11:
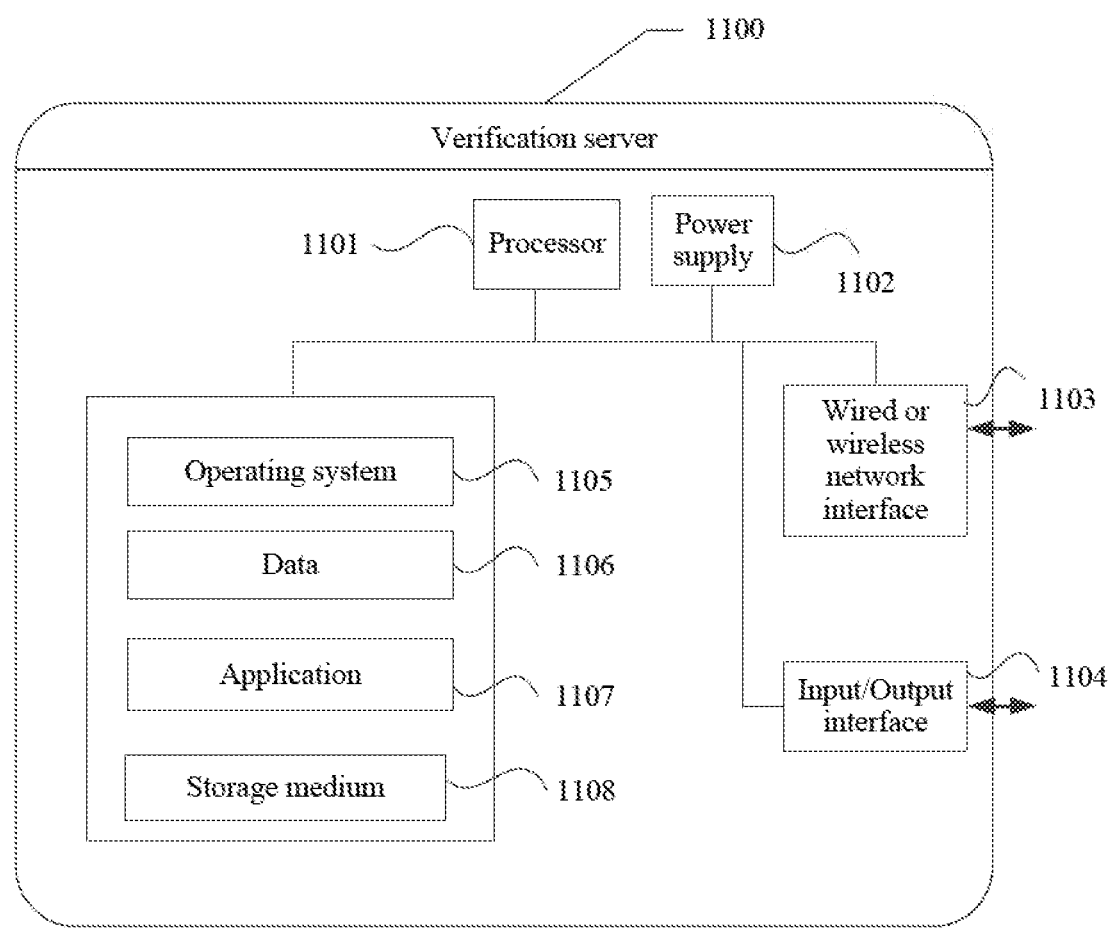
FIG. 11 is another schematic structural diagram of a verification server according to an embodiment of this application.

FIG. 11 is a schematic structural diagram of a verification server according to an embodiment of this application. The verification server 1100 may vary greatly with a configuration or performance, and may include one or more central processing units (CPU) 1101 (for example, one or more processors), a storage medium 1108, and one or more storage media 1108 (for example, one or more mass storage devices) that store an application 1107 or data 1106. The storage medium 1108 may be a transient storage or a persistent storage. A program stored in the storage medium 1108 may include one or more modules (not shown in the figure), and each module may include a series of code for the verification server. Furthermore, the processor 1101 may be set to communicate with the storage medium 1108. The processor 1101 is a control center of the verification server, may use various interfaces and lines to connect various parts in the entire verification server, and may verify various functions of the server and process data by running or executing a software program and/or a module stored in the storage medium 1108 and by calling data stored in the storage medium 1108, to complete validity verification on a secondary certificate sent by a terminal.

The storage medium 1108 may be configured to store a software program and a module. The processor 1101 executes various function applications and data processing of the verification server 1100 by running the software program and the module stored in the storage medium 1108. The storage medium 1108 may mainly include a program storage area and a data storage area. The program storage area may store an operating system, an application required by at least one function (for example, determining whether the secondary certificate is valid), and the like. The data storage area may store data created based on use of the verification server (for example, determining that the secondary certificate is valid) and the like. In addition, the storage medium 1108 may include a high-speed random access memory, and may further include a non-volatile memory, for example, at least one magnetic disk storage, a flash memory, or another volatile solid state memory. A program for the multi-container-based trusted application processing method provided in this embodiment of this application and a received data flow are stored in a memory. When the program and the data flow need to be used, the processor 1101 calls them from the storage medium 1108.

The verification server 1100 may further include one or more power supplies 1102, one or more wired or wireless network interfaces 1103, one or more input/output interfaces 1104, and/or one or more operating systems 1105, such as Windows Serve, Mac OS X, Unix, Linux, and FreeBSD. A person skilled in the art can understand that, a structure of the verification server shown in FIG. 11 constitutes no limitation on the verification server, and may include more or fewer components than those shown in the figure, combine some components, or have different component arrangements.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A multi-container-based trusted application processing method, comprising:
    performing, by a terminal, an integrity check on a signed security computation unit by using a security computation container;
    performing, by the terminal, a validity check on the signed security computation unit by using the security computation container with the signed security computation unit passing the integrity check, and obtaining a check result; and
    loading, by the terminal, the signed security computation unit by using a trusted execution environment or a secure element with the check result being valid, and obtaining a security computation result of a trusted application,
    wherein the performing of the integrity check comprises:
    obtaining, by the terminal, a signature file from the signed security computation unit by using a security computation authorization and loading module in the security computation container;
    obtaining, by the terminal, security computation unit file metadata from the signed security computation unit by using the security computation authorization and loading module;
    performing, by the terminal, digest computation on the security computation unit file metadata by using the security computation authorization and loading module, to obtain a hash value of the security computation unit file metadata; and performing, by the terminal, a check by comparing the hash value with the signature file by using the security computation authorization and loading module.

2. The processing method according to claim 1, wherein the performing of the validity check comprises:

obtaining, by the terminal, a secondary certificate of the signed security computation unit by using the security computation container, the secondary certificate being used to verify validity of the signed security computation unit;

sending, by the terminal, the secondary certificate to a verification server by using the security computation container; and receiving, by the terminal by using the security computation container, the check result sent by the verification server.

3. The processing method according to claim 1, wherein before the performing of the integrity, the method further comprises:

obtaining, by the terminal, a loading request from a main container, the loading request being used for the security computation container of the terminal to load the signed security computation unit, and the signed security computation unit being configured to perform security computation on the trusted application.

4. The processing method according to claim 1, wherein after the loading, the method further comprises:

transmitting, by the terminal, the security computation result to the main container of the terminal.

5. The processing method according to claim 1, wherein the method further comprises:

stopping, by the terminal, a process of loading the signed security computation unit with the signed security computation unit failing the integrity check.

6. The processing method according to claim 1, wherein the method further comprises:

stopping, by the terminal, a process of loading the signed security computation unit with the check result being invalid.

7. A terminal, comprising:
a memory;
a transceiver; and
at least one processor, wherein
the memory stores program code,
the memory, the transceiver, and the at least one processor communicate through a line, and
the processor runs the code to instruct the terminal to execute:

performing an integrity check on a signed security computation unit by using a security computation container;

performing a validity check on the signed security computation unit by using the security computation container with the signed security computation unit passing the integrity check, and obtaining a check result; and loading the signed security computation unit by using a trusted execution environment or a secure element with the check result being valid, and obtaining a security computation result of a trusted application, wherein the security computation container, the trusted execution environment, and the secure element are mutually independent system resources isolated from an operating system kernel, each running an independent operating system.

8. A terminal comprising:
a memory;
a transceiver; and
at least one processor, wherein
the memory stores program code,
the memory, the transceiver, and the at least one processor communicate through a line, and
the processor runs the code to instruct the terminal to execute:

performing an integrity check on a signed security computation unit by using a security computation container;

performing a validity check on the signed security computation unit by using the security computation container with the signed security computation unit passing the integrity check, and obtaining a check result; and loading the signed security computation unit by using a trusted execution environment or a secure element with the check result being valid, and obtaining a security computation result of a trusted application, wherein the processor runs the code to further instruct the terminal to execute:

obtaining a signature file from the signed security computation unit by using a security computation authorization and loading module in the security computation container;

obtaining security computation unit file metadata from the signed security computation unit by using the security computation authorization and loading module;

performing digest computation on the security computation unit file metadata by using the security computation authorization and loading module, to obtain a hash value of the security computation unit file metadata; and performing a check by comparing the hash value with the signature file by using the security computation authorization and loading module.

9. The terminal according to claim 8, wherein the processor runs the code to further instruct the terminal to execute:

obtaining a secondary certificate of the signed security computation unit by using the security computation container, the secondary certificate being used to verify validity of the signed security computation unit;

sending, by the transceiver, the secondary certificate to a verification server by using the security computation container; and receiving, by the transceiver, by using the security computation container, the check result sent by the verification server.

10. The terminal according to claim 8, wherein the processor runs the code to further instruct the terminal to execute:

obtaining, by the terminal, a loading request from a main container, the loading request being used for the security computation container of the terminal to load the signed security computation unit, and the signed security computation unit being configured to perform security computation on the trusted application.

11. The terminal according to claim 8, wherein the processor runs the code to further instruct the terminal to execute:

transmitting the security computation result to the main container of the terminal.

12. The terminal according to claim 8, wherein the processor runs the code to further instruct the terminal to execute:

stopping a process of loading the signed security computation unit with the signed security computation unit failing the integrity check.

13. The terminal according to claim 8, wherein the processor runs the code to further instruct the terminal to execute:

stopping a process of loading the signed security computation unit with the check result being invalid.

* * * * *